April 17, 1951     D. H. GARTH     2,549,077
FISHING LURE
Filed Oct. 19, 1945
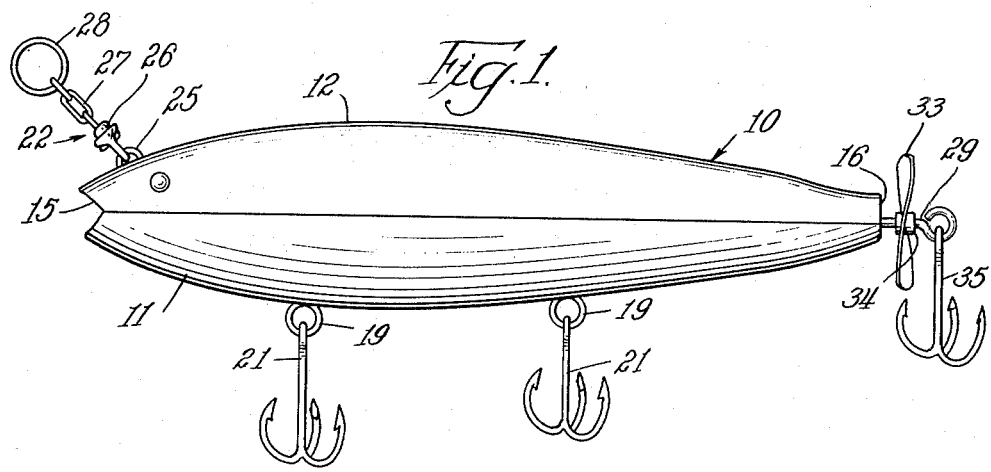
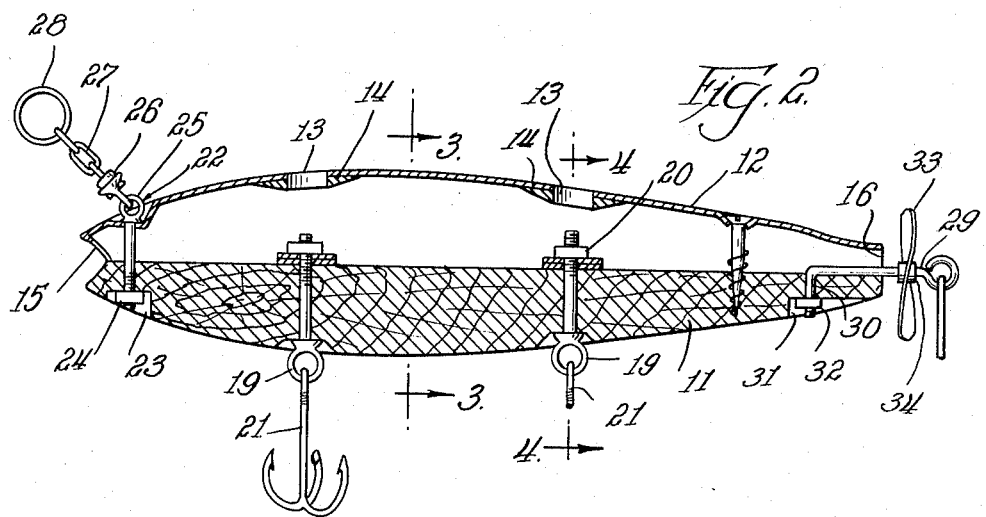
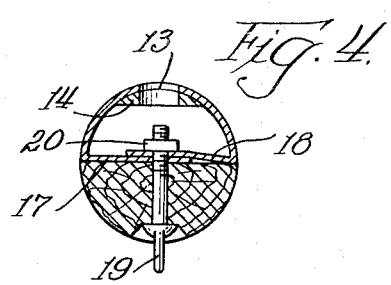
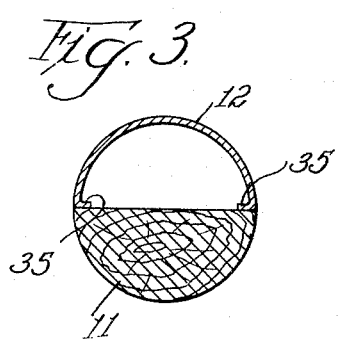
INVENTOR.
Donald H. Garth
BY Joshua R H Potts
att Patented Apr. 17, 1951

2,549,077

UNITED STATES PATENT OFFICE 2,549,077

FISHING LURE

Donald H. Garth, Chicago, Ill.

Application October 19, 1945, Serial No. 623,295

2 Claims. (Cl. 43—42.06)

This invention relates to lures. More particularly, the invention relates to fish lures, capable of making sounds and having new and novel visual effects.

An object of my invention is the provision of a lure adapted to pocket or trap air or water to make a sound, and novel visual effects, to lure fish.

It is important that fish may be lured by sound as well as by sight, and it is my idea that the conventional type of fish lure or plug may be greatly improved by the addition of a noise similar to a gurgling, eructing or croaking sound, as the lure or plug submerges below the surface of the water.

The sounds will differ, depending upon the construction of the lure.

According to the principle of my invention, I accomplish the sound effect by providing apertures, tubes or other passage ways communicating, for example, with a chamber whereby air may be released by gravity when the lure is submerged after it has been thrown or cast by a user.

The purpose of this noise is to imitate as near as possible the sound of a frog getting into the water, as by releasing air bubbles, or fish as they break water, as by a water spout or jet breaking on the surface of the water, all adding to the capability of a lure as a fish catcher.

According to the principle of my invention, for example, the passage ways may be arranged at right or other angles to each other, so that the water will spout or raise above the surface, for example, when the lure is pulled, jerked or trolled. For example, according to the principle of my invention, when the lure is being pulled through the water, the water may be taken in the lure and then ejected upwardly at an angle, so as to give a spout or rippling, or other similar effect above the water, depending upon the size of the holes or tubes and the speed of forward motion, with the jet or spout of water falling to disturb the surface of the water.

The sound may be accomplished by using a hollow section and providing apertures in that section.

This is the form that I have selected for the purpose of illustration, there being an aperture in the forward portion of the lure and a draining aperture in the rearward portion of the lure, for instance, together with apertures in the top of the lure, all for creating sound effects of various kinds.

Another object is the provision of such a construction which is relatively inexpensive and easily made.

Further objects and advantages will appear and be brought out more fully in the following specifications, reference being had to the accompanying drawing, in which:

Fig. 1 is a side elevation of the lure.

Fig. 2 is a vertical section of the same.

Fig. 3 is a transverse section on the line 3—3 of Fig. 2.

Fig. 4 is a transverse section on the line 4—4 of Fig. 2.

Referring to the drawing, in which I have selected for illustration the preferred embodiment of my invention, I have shown a lure 10, having two sections, to-wit: A lower section 11 made of wood, plastic, or other similar substance, and an upper section 12 consisting of a shell of plastic or metal, for example.

The shell may have apertures 13 therethrough and also through bosses 14, mounted upon the shell around said apertures.

In general, the upper shell and the lower wooden section may be made in the form of a fish, having an aperture 15 for the entrance of water, and an exit 16 for the discharge of water.

The shell may have legs 17 and 18 bent inwardly toward each other, as shown in Fig. 4, and an eye bolt 19 may extend through the wooden section and through the legs 17 and 18, to be locked in place by a nut 20, thereby locking the upper section to the lower section.

There may be two or more of these devices for locking the two sections together, and one or more of them may have a hook 21.

Another eye bolt 22 may extend downwardly through the shell into a recess 23, to be locked by a lock nut 24.

The eye 25 of this bolt may be used for anchoring the usual swivel 26, links 27 and large eye 28, for the usual fishing line.

Another eye bolt 29 may be bent, as at 30, through the lower wooden section into a recess 31, to be secured in place by a nut 32.

Mounted on the bolt 29 is a spinner 33, held in place by nuts 34.

The shell may also have inwardly turned flanges 35, so as to rest upon the lower wooden section, as shown in Fig. 3.

The operation will be manifest without further description. When the lure is cast into water, it submerges and the air in the air chamber escapes upwardly through the holes 13 to produce a gurgling, eructing or croaking sound. When the lure is trolled water may be taken in at 15 and is forced out of the apertures 13 to cause a jet or spout, or ripple, on the surface of the water.

Also, the air or water may be forced out at 16 to cause the spinner 33 to rotate and give additional sound effect, as well as visual effect.

A hook 35 may also be located in the eye bolt adjacent the spinner.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a fish lure of the character described, a solid lower body part of elongated formation having a flat upper surface and a rounded lower exposed surface and a complemental upper body part secured to said lower part over the flat surface thereof to provide an upper compartment, said upper part having a rounded surface corresponding to the rounded surface of said bottom part with the two rounded surfaces presenting a portion of maximum cross section more closely adjacent one end of the lure than the other, said upper part being formed with a pair of spaced openings, one being located at one side of said maximum cross section and the other opening on the other side, and means for attaching a line to said lure at the end more closely adjacent to said maximum cross section.

2. In a fish lure of the character described, a solid lower body part of elongated formation having a flat upper surface and a rounded lower exposed surface and a complemental upper body part secured to said lower part over the flat surface thereof to provide an upper compartment, said upper part having a rounded surface corresponding to the rounded surface of said bottom part with the two rounded surfaces presenting a portion of maximum cross section more closely adjacent one end of the lure than the other, said upper part being formed with a pair of spaced openings, one being located at one side of said maximum cross section and the other opening on the other side, an eye secured to the rounded portion of said upper part adjacent to the end to which said maximum cross section is more closely disposed, and a fish hook secured to said solid bottom part.

DONALD H. GARTH.

REFERENCES CITED

The following references are of record in the file of this patent:

UNITED STATES PATENTS

| Number | Name | Date |
|---|---|---|
| 489,110 | Welch | Jan. 3, 1893 |
| 810,822 | Tinkess | Jan. 23, 1906 |
| 1,609,855 | Bayer | Dec. 7, 1926 |
| 2,027,069 | Sorenson | Jan. 7, 1936 |
| 2,229,369 | Buettner | Jan. 21, 1941 |